United States Patent
Guarisco

(10) Patent No.: US 7,667,934 B1
(45) Date of Patent: Feb. 23, 2010

(54) ADAPTIVE READ BIAS

(75) Inventor: Davide Guarisco, San José, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 431 days.

(21) Appl. No.: 11/449,575

(22) Filed: Jun. 7, 2006

Related U.S. Application Data

(60) Provisional application No. 60/688,113, filed on Jun. 7, 2005.

(51) Int. Cl.
*G11B 5/39* (2006.01)

(52) U.S. Cl. .................................. 360/313

(58) Field of Classification Search ............ None
See application file for complete search history.

(56) References Cited

U.S. PATENT DOCUMENTS

| | | | | |
|---|---|---|---|---|
| 6,738,216 B2 * | 5/2004 | Kawana et al. | | 360/75 |
| 7,038,870 B2 * | 5/2006 | Suzuki et al. | | 360/46 |
| 7,460,327 B2 * | 12/2008 | Iwase | | 360/75 |
| 2003/0043496 A1 * | 3/2003 | Kawana et al. | | 360/75 |
| 2004/0212910 A1 * | 10/2004 | Suzuki et al. | | 360/68 |
| 2007/0206313 A1 * | 9/2007 | Iwase | | 360/75 |
| 2007/0242384 A1 * | 10/2007 | Contreras et al. | | 360/66 |

* cited by examiner

*Primary Examiner*—Mark Blouin
(74) *Attorney, Agent, or Firm*—McCarthy Law Group

(57) ABSTRACT

A read system for a hard disk drive comprising a disk having magnetic fields. The read system comprises a read element, a bias source, a temperature sensor, and a controller. The resistance of the read element changes based on the magnetic fields. The bias source applies a bias level to the read element. The temperature sensor generates a temperature signal indicative of a head ambient temperature. The controller adapts the bias level based on the temperature signal.

20 Claims, 1 Drawing Sheet

ADAPTIVE READ BIAS

RELATED APPLICATIONS

Priority is claimed from U.S. Provisional Patent Application Ser. No. 60/688,113 filed on Jun. 7, 2005, which is incorporated by reference in its entirety.

FIELD OF THE INVENTION

The present invention relates to digital storage devices and, more particularly, to systems and methods of determining a bias of a magneto-resistive (MR) read element based on environmental factors.

BACKGROUND OF THE INVENTION

A disk drive is a digital data storage device that stores information on concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a head is positioned adjacent to a desired track of the disk while the disk is spinning.

Writing is performed by delivering a polarity-switching write current signal to the head while the transducer is positioned adjacent to the desired track. The write signal creates a variable magnetic field at a gap portion of the magnetic transducer that induces magnetically polarized transitions on the desired track. The magnetically polarized transitions are representative of the data being stored.

Reading is performed by sensing the magnetically polarized transitions on the disk surface. As the disk spins adjacent to the head, the magnetically polarized transitions on the disk surface induce a varying magnetic field in the head. The head converts the varying magnetic field into a read signal that is delivered to a preamplifier and then to a read channel for appropriate processing. The read channel converts the read signal into a digital signal that is processed and then provided by a controller to a host computer system.

The reading and writing functions of the head are performed by separate elements. The term "head" thus typically includes both a standard thin-film write element and an MR read element. The present invention relates to the MR read element portion of the head.

An MR read element is formed by a conductive read material that changes its resistance in the presence of a magnetic field. As the disk moves relative to the head, the magnetically polarized transitions on the disk cause the resistance of the conductive read material to change. These changes in resistance correspond to the data stored on the disk.

To allow the changes in resistance of the MR read element to be detected, the voltage across (or the current flowing through) the read element is held constant, and the current flowing through (or the voltage across) the read element is measured. Typically (i.e., when the MR read element is operating in its linear range), if either the current or voltage is held constant, the other of the current or voltage will vary in a linear relationship with changes in resistance. Changes in resistance can thus be detected based on the varying parameter. Typically, a bias current applied to the MR element is held constant, and the voltage across the MR element is monitored to detect changes in resistance indicative of changes in magnetically polarized transitions on the disk.

A modern disk drive can be configured to operate even though certain components are not error free. For example, imperfections on the disk surface that interfere with data storage and recovery can be masked by error correction schemes and/or by mapping out failed portions of the disk surface. However, proper operation of the MR read element is important to proper operation of the entire hard disk drive. Stated conversely, if the MR read element fails or the operation thereof is significantly degraded, the entire hard disk drive may become unable to perform as desired or expected.

A number of factors are known to contribute to the failure of the MR read element of a hard disk drive. One such factor is the magnitude of the bias current applied to the MR read element. Over the life of the MR read element, the bias current causes a degradation of the conductive read material forming the MR read element. At some point, the degradation of the conductive read material is such that the MR read element no longer allows data to be read from the disk. However, increasing the bias current increases the sensitivity of the MR read element. Accordingly, the selection of bias current is a tradeoff between increased sensitivity and decreased life.

Another factor that contributes to the failure of the MR read element is the average temperature at which the MR read element operates. The operating temperature of the head is referred to as head ambient temperature. In general, increased head ambient temperature decreases the operational life of the MR read element. The head ambient temperature is typically a function of drive ambient temperature and head self-heating. Often, the drive ambient temperature is significantly greater than the drive ambient temperature for which the drive was designed.

In particular, when a hard disk drive is located in a computer, the head ambient temperature is indirectly controlled by various means such as the use of internal fans. Also, in the past, computers were most frequently used in temperature-controlled environments such as offices. However, modern hard disk drives are often included in devices (e.g., DVR's, iPODs, camcorders, etc.) that do not have internal fans and which are placed in environments (e.g., in living rooms, in automobiles, outdoors, etc.) where the temperature is not always controlled. The resulting increased head ambient temperature can significantly decrease the operational life of the MR read element.

Given that a properly functioning MR read element is important to the proper operation of the hard disk drive, a need exists for systems and methods for increasing the operational life of the MR read element, particularly in the context of the increased head ambient temperatures to which modern MR read elements are exposed.

SUMMARY OF THE INVENTION

The present invention may be embodied as a read system for a hard disk drive comprising a disk having magnetic fields. The read system comprises a read element, a bias source, a temperature sensor, and a controller. The resistance of the read element changes based on the magnetic fields. The bias source applies a bias level to the read element. The temperature sensor generates a temperature signal indicative of a head ambient temperature. The controller adapts the bias level based on the temperature signal.

The present invention may be embodied as a method of reading data from a disk having magnetic fields, comprising the following steps. A read element, having a resistance which changes based on the magnetic fields, is provided. The read element is arranged adjacent to the disk. A bias current is applied to the read element. A temperature signal indicative of a head ambient temperature is generated. The bias current is altered based on the temperature signal.

DETAILED DESCRIPTION

Figure 1:
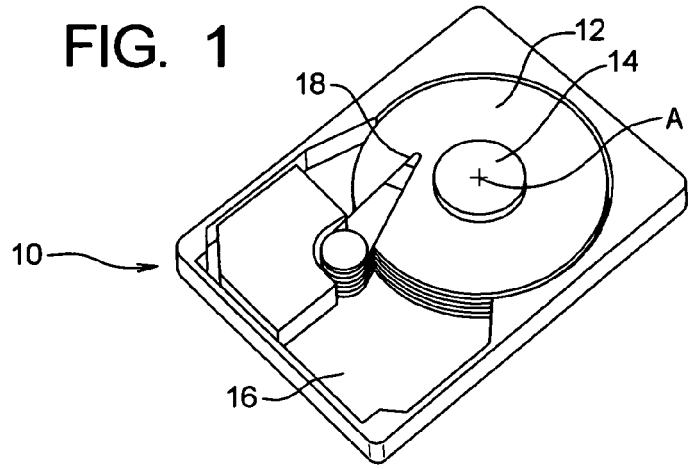
FIG. 1 is a perspective view of a mechanical portion of a hard disk drive constructed in accordance with the principles of the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

FIG. 1 depicts a mechanical portion of an example disk drive 10 constructed in accordance with, and embodying, the principles of the present invention. As is conventional, the mechanical portion of the disk drive 10 includes a disk 12 that is rotated by a spin motor 14. The spin motor 14 is mounted to a base plate 16. The disk drive 10 includes at least one and typically a plurality of disks 12, each with one or two recording surfaces. During use, the disk 12 is rotated about a spindle axis A. The term "cylinder" is often used to refer to the tracks on each of the recording surfaces that are located at the same radial distance from the spindle axis. The disk drive 10 further comprises a head 18 that supports the read and write elements of the hard disk drive system as generally described herein.

Figure 2:
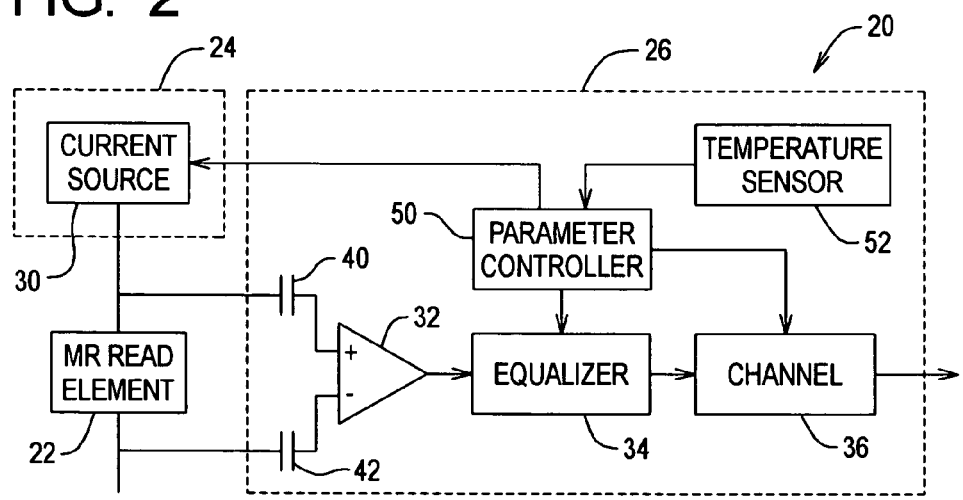
FIG. 2 is a block diagram depicting an example read system used by the hard disk drive depicted in FIG. 1.

FIG. 2 depicts a read system 20 comprising an MR read element 22, a bias source 24, and a signal detect system 26. As is conventional, the head 18 comprises or supports the MR read element 22. As generally described above, the effective life of the MR read element 22 decreases both with increases in bias levels applied to the MR read element 22 and with increases in head ambient temperature. In a modern hard disk drive, the MR read element 22 is formed by a giant magnetoresistive (GMR) read head. However, the principles of the present invention may be applied to any read head technology in which high temperature adversely affects head life and a bias level may be adapted based on temperature. For example, the present invention is applicable to tunneling MR (TuMR) heads.

The bias source 24 applies a bias level, either voltage or current, to the MR read element 22. A readback signal associated with the MR read element 22 is monitored for changes in resistance indicative of changes in magnetic field. The signal detect system 26 of the read system 20 generates a data signal based on the readback signal.

The read system 20 of the present invention yields an overall increase in read element life by altering the bias levels applied to the MR read element 22 based on changes in the head ambient temperature. The bias levels can be altered in an inverse relationship to head ambient temperature, or the bias levels can be altered in stages based on one or more transition temperature levels. In either case, decreases in bias levels yield increases in read element life that can, at least in part, offset decreases in read element life caused by elevated head ambient temperatures.

In addition, the example read system 20 further comprises at least one set of read system parameters associated with the bias source 24 and the signal detect system 26. The read system parameters optimize generation of the data signal based on the readback signal. In the example read system 20, the read system parameters are optionally altered based on the head ambient temperature.

With the foregoing general understanding of the present invention in mind, the details of the example read system 20 will now be described in further detail.

The bias source 24 of the example read system 20 comprises a current source 30, while the signal detect system 26 comprises a preamplifier amplifier 32, an equalizer 34, and a channel 36. FIG. 2 further shows that the example read circuit includes a pair of capacitors 40 and 42 that operate as DC blockers as will be described further below. A parameter controller 50 is operatively connected to a temperature sensor 52 and to the current source 30, the preamplifier 32 (via equalizer 34), the equalizer 34, and the channel 36.

The current source 30 is used to bias the MR read element 22. The magnitude of the bias current generated by the current source 30 is determined by a bias control signal. The bias control signal determines or corresponds to a level or value of the bias current used to bias the MR read element.

As generally discussed above, a resistance of the MR read element 22 changes based on magnetic fields associated with the magnetically polarized transitions on the disk 12 adjacent to the MR read element. The voltage across the MR read element 22 is equal to the product of the bias current generated by the current source 30 and the resistance of the MR read element 22. The voltage across the MR read element 22 forms the readback signal will be referred to herein as "the readback voltage signal."

The readback voltage signal may be processed to determine changes in resistance of the MR read head that are associated with changes in magnetic fields associated with the magnetically polarized transitions on the disk 12 adjacent to the MR read element. In an alternative system design, the voltage across the MR read element 22 may be held constant, and the current ("the readback current") may be measured to determine the resistance of the MR read element 22.

The preamplifier 32 is configured to generate an amplifier output signal based on a product of a gain constant and a difference between its non-inverting and inverting inputs. As shown in FIG. 2, the non-inverting and inverting inputs of the differential amplifier 32 are connected to either side of the MR read element 22. In the example read system 20, the amplifier output signal is thus equal to the readback voltage signal multiplied by the gain constant. The DC blocking capacitors 40 and 42 form a filter that allows only a varying portion of the readback voltage signal to reach the inputs of the differential amplifier 32 (filters out a low frequency or non-varying portion of the readback voltage signal).

The equalizer 34 generates an equalized output signal by amplifying and/or attenuating certain portions of the amplifier output signal according to equalization parameters. The equalization parameters may take the form of an equalization curve indicating which portions of the amplifier output signal are amplified and which portions are attenuated. The channel 36 processes the equalized output signal to generate a data output signal by, for example, demodulating the equalized output signal based on demodulation parameters. The data output signal may be used by, for example, a dedicated processor or host computer.

The parameter controller 50 stores or has access to the read system parameters that are used by the various components of the read system 20. In the example hard disk drive 10, the read system parameters, and perhaps other system information, is stored on a utility zone (formed of, e.g., a sector, a track or a group of tracks) of the disk 12. The parameter controller 50 is responsible for passing the read system parameters to the appropriate read system components.

More specifically, due to manufacturing considerations, the operating characteristics of various components of a given read system may differ from the operating characteristics of the equivalent components of other read systems. Possible examples of the read system parameters include the bias control signal that determines the bias current generated by the current source 30, the gain constant associated with the differential amplifier 32, the equalization curve associated with the equalizer 34, and/or the demodulation parameters associated with the channel 36.

Conventional hard disk drives are subjected at least once to a self-test process during which one or more of the read system parameters are determined. During the self-test process, parameters associated with read system components, such as the current source 30, the preamplifier 32, the equalizer 34, and/or the channel 36, are determined and stored in the utility zone on the disk 12. Then, during normal operation of the hard disk drive, these parameters are retrieved and used to control operation of the read system components. The read system parameters thus allow a particular read system 20 to be optimized or "tuned" for the operating characteristics of the particular components that comprise that particular read system 20.

Typically, the self-test process is conducted at the factory during what is referred to as an initial drive self-test. However, one or more portions of the self-test process can be conducted throughout the life of the drive. Whenever the self-test process is running, however, the drive may be unavailable for normal read and write operations (or, at least, it operates a lower performance capability). The use of self-test after manufacture of the drive is thus typically kept to a minimum, both in frequency and duration.

In the read system 20 of the present invention, the parameter controller 50 further receives a temperature signal from the temperature sensor 52. The temperature sensor 52 is located such that the temperature signal is indicative of the head ambient temperature. In particular, the temperature sensor 52 may be located immediately adjacent to the head so that the temperature signal directly represents the head ambient temperature, or the temperature sensor 52 may be located such that the temperature signal has a known or predictable relationship with the head ambient temperature.

The example parameter controller 50 used by read system 20 of the present invention selects an appropriate set of read system parameters based on the head ambient temperature as indicated by the temperature signal. In this context, the set of read parameters includes at least a bias control signal. Optionally, the set of read parameters includes one or more of the gain constant, equalization curve, and the demodulation parameters. Each set of read system parameters is associated with a unique mode of operation of the read system 20.

The example parameter controller 50 selects a first set of read system parameters when the temperature signal indicates that the head ambient temperature is below a transition temperature level and selects a second set of read system parameters when the temperature signal indicates that the head ambient temperature is above the transition temperature level. When a single transition temperature value is used, two sets of read system parameters are generated during the self-test process. The first set of read system parameters is associated with and/or defines a first bias current level, while the second set of read system parameters is associated with and/or defines a second bias current level.

The example read system 20 thus operates in first and second modes based on the temperature signal. The first mode corresponds to a "normal" mode, while the second mode corresponds to a "high-temperature" mode.

Optionally, first and second transition temperature levels may be defined. In this case, first, second, and third sets of read system parameters are generated during the self-test process. The parameter controller 50 selects the first set of read system parameters when the temperature signal indicates that the head ambient temperature is below the first transition temperature level, the second set of read system parameters when the temperature signal indicates that the head ambient temperature is above the first transition temperature level and below the second transition temperature level, and the third set of read system parameters when the temperature signal indicates that the head ambient temperature is above the second transition temperature level. In this optional case, the read system 20 thus operates in first, second, and third modes based on the temperature signal.

Given the foregoing, it should be apparent that more than two temperature levels and more than three sets of read system parameters may be used. Each set of read system parameters extends the duration of the self-test process by approximately ten percent. The selection of the number of temperature levels and associated sets of read system parameters thus represents a tradeoff between the extent by which head life may be prolonged and the duration of the self-test process.

In addition, the temperature transition levels may be selected such that the read system 20 operates in a "normal" mode and a "low-temperature" mode. In the low temperature mode, the bias levels may be increased to provide increased sensitivity, with the understanding that any degradation in life of the read element 22 associated with such increased bias levels will be offset by the lower head ambient temperature. In this case, the read system 20 may also be configured to operate in a high-temperature mode as generally described above. Of course, more than two modes are possible and anticipated.

As another variation, the disk drive 10 may be placed in an oven during at least a portion of the self-test process to simulate the conditions under which the read system 20 will be operating when in the high-temperature mode. The read system parameters generated when the read system 20 is operating at the elevated temperatures associated with the high-temperature mode may result in improved optimization of the system parameters generated for future use in the high-temperature mode.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

I claim:

1. A read system for a device having magnetic fields, comprising:
    a read element, having a resistance of which changes based on the magnetic fields;
    a bias source that applies a bias level to the read element;
    a temperature sensor that generates a temperature signal indicative of a head ambient temperature associated with the read element; and
    a controller responsive to the temperature signal that sets the bias level at a first constant value for each of a range of head ambient temperatures all less than a predetermined transition temperature and that sets the bias level at a different second constant value for each of another range of head ambient temperatures all greater than the transition temperature.

2. A read system as recited in claim 1, in which the controller varies the bias level in inverse proportion to the head ambient temperature.

3. A read system as recited in claim 1, in which the controller reduces the bias level when the head ambient temperature increases.

4. A read system as recited in claim 1, in which the controller sets the bias level at:
   the first constant value for all head ambient temperatures below the transition temperature; and
   the second constant value for all head ambient temperatures above the transition temperature.

5. A read system as recited in claim 1, in which the controller sets the bias level at:
   the first constant value when the head ambient temperature is below the transition temperature;
   the second constant value when the head ambient temperature is above the transition temperature and below a second transition temperature; and
   a third constant value when the head ambient temperature is above the second transition temperature.

6. A read system as recited in claim 1, further comprising a signal detect system in which at least one read system parameter is altered based on the temperature signal.

7. A read system as recited in claim 1, where the read system operates in:
   a first mode when the temperature signal indicates that the head ambient temperature is below the transition temperature; and
   a second mode when the temperature signal indicates that the head ambient temperature is above the transition temperature.

8. A read system as recited in claim 7, further comprising first and second sets of read system parameters, where the read system operates under the influence of:
   the first set of read system parameters in the first mode; and
   the second set of read system parameters in the second mode.

9. A read system as recited in claim 1, further comprising a signal detect system that generates a data signal based on a readback signal indicative of the resistance of the read element.

10. A read system as recited in claim 9, in which the signal detect system comprises a channel that generates the data signal based on the readback signal.

11. A read system as recited in claim 10, in which the channel further generates the data signal based on channel parameters.

12. A read system as recited in claim 9, in which the signal detect system comprises an amplifier that generates an amplified output signal based on the readback signal.

13. A read system as recited in claim 12, in which the amplifier further generates the amplified output signal based on a gain constant.

14. A read system as recited in claim 9, in which the signal detect system comprises an equalizer that generates an equalized output signal based on the readback signal.

15. A read system as recited in claim 14, in which the equalizer further generates the equalized output signal based on equalization parameters.

16. A read system as recited in claim 14, in which the equalizer further generates the equalized output signal based on an equalization curve.

17. A read system as recited in claim 9, in which the signal detect system comprises a filter that passes a varying portion of the readback signal.

18. A read system as recited in claim 9 in which the signal detect system comprises:
   a filter that generates a filtered signal based on the readback signal;
   an amplifier that generates an amplified output signal based on the filtered signal;
   an equalizer that generates an equalized output signal based on the amplified output signal; and
   a channel that generates the data signal based on the equalized output signal.

19. A read system as recited in claim 18, in which the signal detect system further comprises two or more sets of read system parameters associated with at least one of the amplifier, equalizer, and channel.

20. A read system as recited in claim 19, in which the read system parameters include at least one of a gain constant associated with the amplifier equalization parameters associated with the equalizer, and channel parameters associated with the channel.

* * * * *